L. W. HOLMES.
ANTISKID DEVICE FOR DUAL TIRE AUTOTRUCK WHEELS.
APPLICATION FILED MAY 5, 1919.
1,329,766.
Patented Feb. 3, 1920.
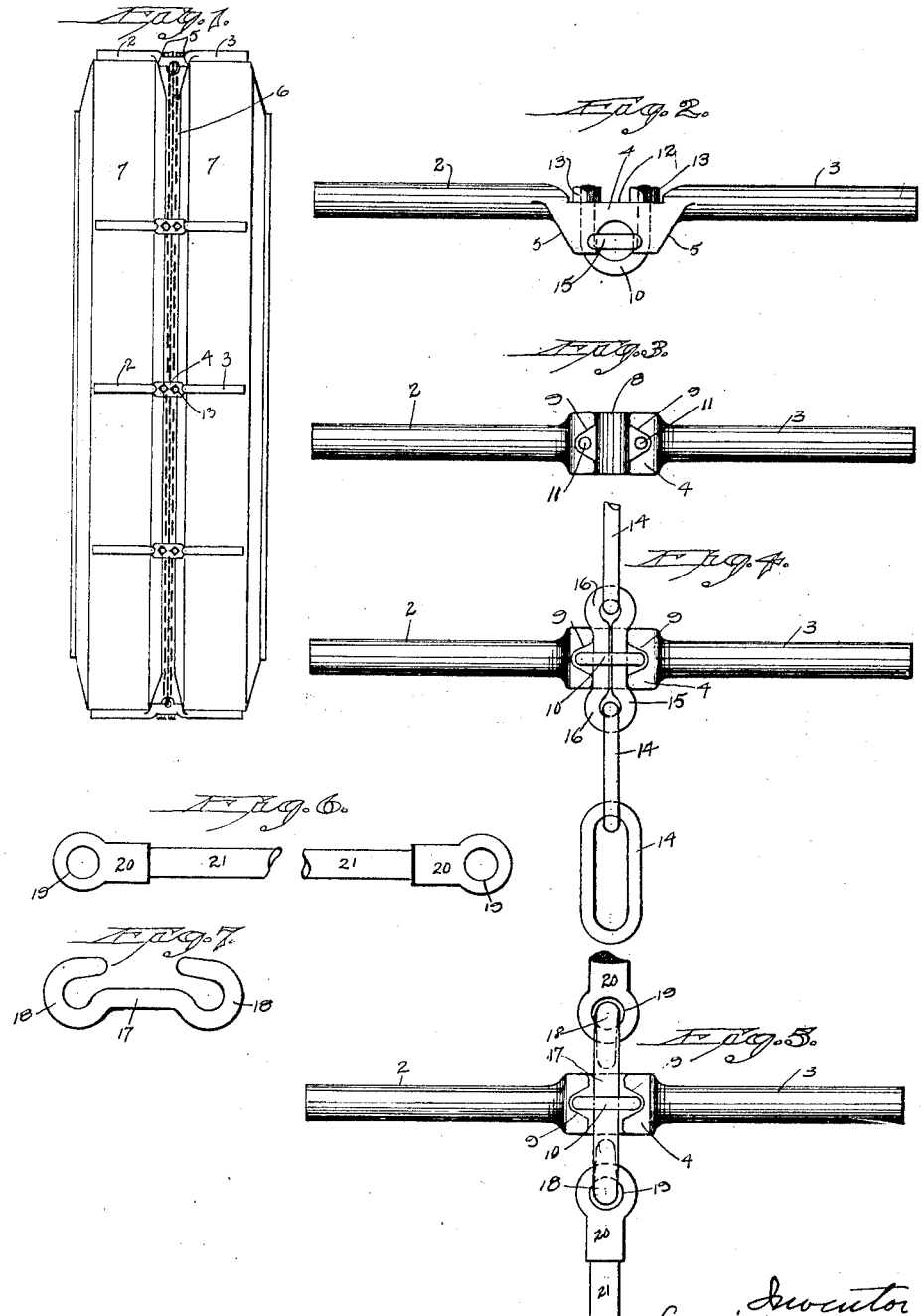

UNITED STATES PATENT OFFICE.

LESLIE WILLIAM HOLMES, OF SHELTON, CONNECTICUT, ASSIGNOR TO HOLMES MANUFACTURING CO., OF SHELTON, CONNECTICUT, A CORPORATION.

ANTISKID DEVICE FOR DUAL-TIRE AUTOTRUCK-WHEELS.

1,329,766.     Specification of Letters Patent.     Patented Feb. 3, 1920.

Application filed May 5, 1919. Serial No. 294,886.

*To all whom it may concern:*

Be it known that I, LESLIE W. HOLMES, a citizen of the United States, residing at Shelton, in the county of Fairfield and State of Connecticut, have invented a new and useful Improvement in Antiskid Devices for Dual-Tire Autotruck-Wheels; and I do hereby declare the following, when taken in connection with the accompanying drawings and the characters of reference marked thereon, to be a full, clear, and exact description of the same, and which said drawings constitute part of this application, and represent, in—

Figure 1 an edge view of a dual-tire autotruck wheel provided with my improved anti-skid device.

Fig. 2 a detached view in side elevation of one of my improved grippers showing its U-bolt as engaged with a coupling-link of the chain.

Fig. 3 a reverse plan view thereof with the bolt and link removed.

Fig. 4 a reverse plan view showing the mounting of a gripper upon the chain which is broken away.

Fig. 5 a similar view showing a modified form of chain.

Fig. 6 a detached broken view of one of the cable sections of such modified form of chain.

Fig. 7 a detached view in elevation showing one of the spacing links of such chain.

This invention relates to an improvement in anti-skid devices for dual-tire auto-truck wheels, the object being to provide at a low cost for manufacture, a simple, convenient, durable and reliable device adapted to be applied and removed without removing the wheel, and constructed with particular reference to the employment of a chain for holding the grippers in spaced relation to each other and in place upon the tire.

With these ends in view, my invention consists in an anti-skid device for auto-truck wheels, having certain details of construction as will be hereinafter described and pointed out in the claim.

In carrying out my invention as herein shown, I employ a plurality of transversely arranged one-piece metal grippers each consisting of two complementary rod-like treads 2 and 3 extending in opposite directions and merging at their inner ends into a positioning-head 4 offsetting inwardly from the plane of the treads 2 and 3 and having beveled end walls 5 adapting it to fit into the wedge-like inter-tire space 6 between the two tires 7, 7, to the width of the running faces of which the treads 2 and 3 correspond in length. The inner face of the head 4 is formed with a centrally arranged transverse channel 8 of rounded cross-section. The opposite walls of the channel 8 are formed with V-shaped clearance-recesses 9 for the reception of a U-bolt 10 the legs of which pass through bolt-holes 11 registered with the said recesses and formed in the head 4 on opposite sides of the channel 8. The threaded ends of the bolt 10 project into a shallow recess 12 produced upon the outer face of the head 4 by inwardly offsetting the head 4 from the treads 2 and 3 and are deep enough for the reception of the nuts 13 of the U-bolt, whereby the nuts are brought within the running surface of the treads.

A plurality of such grippers will be strung, as it were, at equal distances apart upon a chain consisting, as shown in Figs. 1 to 4 inclusive, of groups of ordinary chain links 14 with coupling-links 15 introduced between such groups at regular intervals, dependent upon the number of grippers it is designed to use. The special links 15 have their side reaches closed together as clearly shown in Fig. 4 to adapt them to fit into the channels 8 of the heads 4 of the grippers. The ends of the links are in consequence formed into eyes 16 which are wider than the channels 8, whereby the links 15 are held against endwise movement therein. In place of using such a chain as described, I may employ a modified form of chain, such as shown in Figs. 5 to 7 inclusive, this chain consisting of spacing-links 17 each formed at its ends with eye-hooks 18 adapted to be hooked into the eyes 19 of clips 20 constructed to be pinched upon the ends 20 of short sections of cable 21. After the eye-hooks 18 have been passed through the eye 19 of the clips 20, they are closed. In this modified construction the links 17 are arranged edgewise in the channels 8 instead of flatwise.

I am aware that an anti-skid device for dual-tire auto-truck wheels having transversely arranged grippers mounted at regular intervals upon an endless chain is old and do not claim that construction broadly, but only my specific construction of the grippers and their adaptation to be mounted upon the links of an endless chain.

I claim:—

An anti-skid device for dual-tire auto-truck wheels, having a gripper consisting of two oppositely extending treads merging at their inner ends into an inwardly offsetting positioning-head having inclined end walls to adapt it to fit into the inter-tire space of the wheel, the outer face of the said head being depressed with respect to the wearing faces of the treads and the inner face of the head being formed with a transverse chain-receiving channel, the side walls of which are recessed for the clearance of a U-bolt passing outwardly through the head and fastened with nuts located within the recess formed by depressing the outer face of the head with respect to the wearing faces of the said treads.

In testimony whereof, I have signed this specification in the presence of two subscribing witnesses.

LESLIE WILLIAM HOLMES.

Witnesses:
 ELEANOR JOHNS,
 HARRY B. GORHAM.